E. BATWELL.
Horse-Collars.

No. 137,879. Patented April 15, 1873.

WITNESSES.
Wm. Johnson
Wm. H. Kendig.

INVENTOR.
Edward Batwell
per
Fred. A. Lehmann
atty.

UNITED STATES PATENT OFFICE.

EDWARD BATWELL, OF YPSILANTI, MICHIGAN.

IMPROVEMENT IN HORSE-COLLARS.

Specification forming part of Letters Patent No. 137,879, dated April 15, 1873; application filed March 25, 1873.

*To all whom it may concern:*

Be it known that I, EDWARD BATWELL, of Ypsilanti, in the county of Washtenaw and State of Michigan, have invented certain new and useful Improvements in Horse-Collars; and I do hereby declare the following to be a full, clear, and exact description of the invention, such as will enable others skilled in the art to which it pertains to make and use it, reference being had to the accompanying drawing, which forms part of this specification.

The nature of my invention relates to an improvement in horse-collars; and consists in bracing and strengthening the "throat" with a metal plate, of any suitable kind, so as to preserve the shape of the collar and to prevent them from breaking or from closing on the horse's shoulders, as will be more fully described hereafter.

Figure 1:
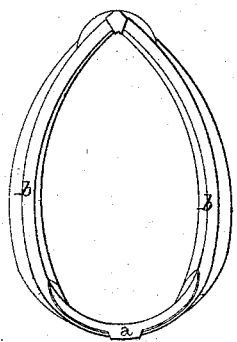
Figure 2:
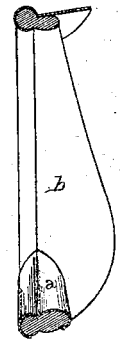

Figure 1 represents a front view of the collar. Fig. 2 is a section of the same.

The weak part of a collar is at the throat. Here the strain upon it invariably breaks it, and then it loses its shape, and at the slightest pull closes upon the horse's shoulders. In order to obviate these defects I take a sheet, $a$, of any suitable metal, and apply it to the collar $b$ upon the inside, at that part which bears against the horse's throat, and upon which the greatest strain comes. The plate is made to conform to the shape of the collar, and extends upward along the sides for a suitable distance so as to preserve the shape, and is held securely in place by the ears which project from its center, and which are bent downward and around the lower edge so as to form clasps. This plate braces and strengthens the collar its whole length, and effectually remedies all of the above evils, while being very simple and cheap in its application. The plate may be secured in place by any suitable means or devices, either when the collar is being made, or the plates may be stamped out and kept for sale, to be applied at any subsequent time.

Having thus described my invention, what I claim as new, and desire to secure by Letters Patent, is—

A plate, $a$, constructed as described, and attached to the inner lower end of a horse-collar, as and for the purpose set forth.

In testimony that I claim the foregoing I have hereunto set my hand this 11th day of March, 1873.

EDWARD BATWELL.

Witnesses:
 D. W. SHIPMAN,
 STOWEL H. DIMICK.